United States Patent [19]

Ramer et al.

[11] 4,198,742
[45] Apr. 22, 1980

[54] METHOD FOR THE PRODUCTION OF A SOLID ELECTROLYTIC CAPACITOR

[75] Inventors: Robert Ramer; Rudolf Soldner, both of Heidenheim, Fed. Rep. of Germany

[73] Assignee: Siemens Aktiengesellschaft, Berlin & Munich, Fed. Rep. of Germany

[21] Appl. No.: 904,873

[22] Filed: May 11, 1978

[30] Foreign Application Priority Data

May 20, 1977 [DE] Fed. Rep. of Germany ....... 2722899

[51] Int. Cl.$^2$ .............................................. B01J 17/00
[52] U.S. Cl. ...................................... 29/570; 427/429; 361/433
[58] Field of Search ........................... 29/570; 427/429

[56] References Cited

U.S. PATENT DOCUMENTS

| | | | |
|---|---|---|---|
| 3,967,000 | 6/1976 | Klein | 427/58 |
| 4,017,773 | 4/1977 | Cheseldine | 29/570 |
| 4,090,288 | 5/1978 | Thompson | 29/570 |
| 4,127,738 | 11/1978 | Ghosh | 357/15 |

Primary Examiner—W. C. Tupman
Attorney, Agent, or Firm—Hill, Van Santen, Steadman, Chiara & Simpson

[57] ABSTRACT

A solid electrolytic capacitor has an anode which consists of a sintered tantalum member having a dielectrically effective oxide layer located thereon and a counterelectrode consisting of semiconducting manganese dioxide. An anode wire is coated with polytetrafluorethylene in the vicinity of the point it enters the sintered member. In a method for producing such an electrolytic capacitor, the anode wire is brushed with a suspension containing the polytetrafluorethylene in a solvent in the vicinity of the wire entry point, before the manganese dioxide layer is produced, and the suspension is burnt-in for annealed after such application, where annealing occurs at a temperature of approximately 300° C. over a period of time of approximately ten minutes.

2 Claims, No Drawings

METHOD FOR THE PRODUCTION OF A SOLID ELECTROLYTIC CAPACITOR

DESCRIPTION

The present invention relates to a method for the production of a solid electrolytic capacitor which has an anode consisting of a sintered tantalum body with a dielectrically effective oxide layer thereon, the capacitor also including a counterelectrode consisting of semiconducting manganese dioxide, and an anode wire which is coated with polytetrafluorethylene in the vicinity of the point at which it enters the sintered member.

It was found out that the point of entry of the anode wire into the sintered member and also the vicinity of this point in solid electrolytic capacitors represents an area which is susceptible to trouble. This can be traced to the fact that the aqueous solution utilized for producing the semi-conducting managanese dioxide layer can rise on the anode wire during the dipping of the sintered members due to capillary action, and that, on the other hand, trouble can occur due to a strong mechanical stress of the points mentioned during the production process. The consequence of the trouble mentioned is that the leakage currents can be unproportionately great and that even short circuits can occur.

A solid electrolyte type of capacitor is known from the German Utility Model No. 1,852,862. In that capacitor, a disc of insulating mafterial is arranged on the anode wire in order to remove the trouble mentioned such that the disc abuts the anode and is attached with the aid of a drop of cold-setting synthetic resin or silicon rubber. The attachment of the protective disc is relatively expensive and presupposes under certain conditions that the sintered members which are attached to the anode wires in support devices for a more simple process, are separated from these devices in order to attach the insulating discs, and subsequently must be reattached. It also cannot be ignored that the aqueous manganese nitrate solution can "underwander" the protective disc whereby the trouble mentioned above can occur.

A solid electrolytic capacitor is also known from the German published application No. 1,157,707, whose anode wire is provided with an insulating layer in the vicinity of the point of entry into the sintered member, the insulating layer being produced by condensation of an organic silicon compound. Even if this insulating layer can be produced in a simple manner than the protection with the aid of an insulating disc, it nevertheless requires the unproportionately high temperatures of 400°–500° C. for production.

A method for the production of a polytetrafluorethylene (PTEE) coating of the anode wire is known from U.S. Pat. No. 3,967,000.

In this known method, the PTFE is sprayed on by pressure, or the total anode member is dipped into a bath containing polytetrafluorethylene. Deionized water, which wets the sintered member, is used in both cases for masking. However, the danger exists that parts of the sintered member, not covered by water, are covered by polytetrafluoroethylene, or that water residues are present at the anode wire, and thus only an incomplete layer occurs.

SUMMARY OF THE INVENTION

It is the object of the invention to provide a method for the production of a solid electrolytic capacitor of the type generally mentioned above, with the aid of which the previously mentioned difficulties are avoided.

This object is achieved in that, in the vicinity of the entry point of the anode wire into the sintered member, the anode wire is coated with a suspension before the manganese dioxide layer is produced, the suspension containing the polytetrafluoroethylene in a solvent, and the suspension is subsequently annealed after application thereof onto the sintered member.

The annealing advantageously takes place at a temperature of about 300° C. during a time of approximately 10 minutes.

The advantages of the invention can be seen in that the protective layer can be applied in a simple manner (for example by brushing-on) and that the application can also be subsequently carried out after the sintered members are attached to support devices or after a thermal treatment of the anodes in the support devices. Due to the nonhygroscopic property of the polytetrafluorethylene a wetting of the anode wire in the vicinity of the entry point into the sintered member is safely prevented. The method of the present invention guarantees with safety, that the polytetrafluorethylene coating is only present on the anode wire and is at that point flawless.

It should also be emphasized as an advantage, that the production of the protective layer proceeds at a temperature of 300° C., whereby the use of unproportionaly high temperature is avoided.

Capacitors produced by the present invention are distinguished by the low leakage current values which, moreover, exhibit a low scattering width. No great alterations of the leakage current values occur at temperature-shock examinations in accordance with MIL 39003 (−65° C./+125° C.), and the capacitance yield and its scattering width in the capacitors produced by the present invention are also advantageous.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method of producing a solid electrolytic capacitor which has a sintered tantalum member as an anode, a dielectrically effective oxide layer on the tantalum member, a semi-conducting manganese dioxide counter electrode, and an anode wire attached to the sintered tantalum member, the improvement therein comprising the steps of:
    before producing the manganese dioxide layer, applying a suspension of polytetrafluoroethylene in a solvent on the anode wire only at the entry point of the anode wire into the sintered member; and annealing the suspension after the application thereof onto the anode wire by heating the suspension at a temperature of approximately 300° C. for a time of approximately 10 minutes.

2. The improved method set forth in claim 1, wherein the step of applying the suspension is further defined as:
    brushing the suspension onto the anode wire.

* * * * *